United States Patent
Tanaami et al.

(10) Patent No.: US 12,358,131 B2
(45) Date of Patent: Jul. 15, 2025

(54) AUTOMATIC APPLICATION DEVICE AND AUTOMATIC APPLICATION METHOD

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 403 days.

(21) Appl. No.: 17/851,505

(22) Filed: Jun. 28, 2022

(65) Prior Publication Data

US 2023/0059095 A1 Feb. 23, 2023

(30) Foreign Application Priority Data

Aug. 18, 2021 (JP) ................................. 2021-133257

(51) Int. Cl.
*G06F 3/048* (2013.01)
*B25J 9/16* (2006.01)
*B25J 13/08* (2006.01)

(52) U.S. Cl.
CPC ............ *B25J 9/1612* (2013.01); *B25J 13/085* (2013.01)

(58) Field of Classification Search
CPC ........ B25J 9/1612; B25J 13/085; B25J 5/007; B25J 9/1633; B25J 11/0075; B25J 9/162; B25J 19/02; G05B 2219/40298; G05B 2219/45065; E04F 21/08; G01L 5/16; G01L 5/0061; B05B 13/0431; B05B 13/005; B05C 1/08; B05C 11/1015
See application file for complete search history.

(56) References Cited

U.S. PATENT DOCUMENTS

| | | | | |
|---|---|---|---|---|
| 5,592,275 A | * | 1/1997 | Echigo | G03G 15/2025 399/327 |
| 2009/0090795 A1 | * | 4/2009 | Ray | B05B 13/0278 427/427.1 |
| 2009/0192523 A1 | | 7/2009 | Larkin et al. | |
| 2011/0190932 A1 | | 8/2011 | Tsusaka et al. | |
| 2011/0208355 A1 | | 8/2011 | Tsusaka | |
| 2016/0184032 A1 | | 6/2016 | Romo et al. | |
| 2017/0080562 A1 | | 3/2017 | Tsuzaki | |
| 2018/0029232 A1 | | 2/2018 | Ouchi et al. | |
| 2018/0243916 A1 | | 8/2018 | Hashimoto et al. | |

(Continued)

FOREIGN PATENT DOCUMENTS

| | | |
|---|---|---|
| JP | 02-009553 A | 1/1990 |
| JP | H11-76911 A | 3/1999 |
| JP | 2009-274191 A | 11/2009 |
| JP | 2019018340 A | 2/2019 |
| JP | 2019-081236 A | 5/2019 |
| JP | 2019-141937 A | 8/2019 |

OTHER PUBLICATIONS

U.S. Office Action for U.S. Appl. No. 18/173,342 issued on Nov. 21, 2024.

(Continued)

*Primary Examiner* — Aleksey Olshannikov
(74) *Attorney, Agent, or Firm* — Harness, Dickey & Pierce, P.L.C.

(57) ABSTRACT

An automatic application device includes: a robot arm; an application hand configured to apply, to a workpiece, a paint that is a liquid; a force sensor configured to detect a force and a moment acting on the application hand; and a control section configured to control the robot arm in accordance with a parameter calculated from an output signal from the force sensor.

13 Claims, 10 Drawing Sheets

(56) References Cited

U.S. PATENT DOCUMENTS

| | | |
|---|---|---|
| 2018/0281012 A1* | 10/2018 | Telleria .................. E04F 21/08 |
| 2018/0319013 A1 | 11/2018 | Shimodaira |
| 2019/0217468 A1 | 7/2019 | Ogata |
| 2019/0232492 A1* | 8/2019 | Takeuchi .................. B25J 9/16 |
| 2019/0248006 A1 | 8/2019 | Takahashi |
| 2019/0255712 A1 | 8/2019 | Takeuchi |
| 2019/0283250 A1 | 9/2019 | Iwai et al. |
| 2019/0358811 A1 | 11/2019 | Sato et al. |
| 2020/0147787 A1 | 5/2020 | Takahashi |
| 2021/0339392 A1 | 11/2021 | Handa et al. |
| 2022/0305645 A1 | 9/2022 | Nikovski et al. |
| 2023/0032334 A1 | 2/2023 | Hane |
| 2023/0278205 A1 | 9/2023 | Yamaoka et al. |

OTHER PUBLICATIONS

U.S. Office Action for U.S. Appl. No. 17/509,116 issued on Oct. 2, 2023.
U.S. Office Action for U.S. Appl. No. 17/509,116 issued on Mar. 4, 2024.
U.S. Office Action for U.S. Appl. No. 17/509,116 issued on Jul. 8, 2024.
U.S. Office Action for U.S. Appl. No. 17/509,116 issued on Nov. 27, 2024.
Japanese Office Action for Japanese Application No. 2021-162931 issued on Jan. 14, 2025 and English machine translation thereof.

* cited by examiner

AUTOMATIC APPLICATION DEVICE AND AUTOMATIC APPLICATION METHOD

This Nonprovisional application claims priority under 35 U.S.C. § 119 on Patent Application No. 2021-133257 filed in Japan on Aug. 18, 2021, the entire contents of which are hereby incorporated by reference.

TECHNICAL FIELD

The present invention relates to an automatic application device for carrying out automatic application of a liquid such as a paint or an adhesive and to an automatic application method carried out by the automatic application device.

BACKGROUND ART

Conventionally, an application device for applying a liquid such as a paint or an adhesive to a workpiece is provided with various sensors for the purpose of enhancing the efficiency and accuracy in an application work. For example, Patent Literature 1 discloses a painting tool including a roller with a handle and an acceleration sensor attached to the handle, wherein a paint is automatically supplied to the roller in accordance with a detection result from the acceleration sensor.

CITATION LIST

Patent Literature

Patent Literature 1

Japanese Patent Application Publication, Tokukaihei, No. 11-076911 (1999)

SUMMARY OF INVENTION

Technical Problem

In a case where an application work is carried out in a state where the roller is in contact with a workpiece, the roller receives a force and/or a moment applied by the workpiece. However, with the application device disclosed in Patent Literature 1, it is impossible to detect the moment applied to the roller by the workpiece. Thus, if the roller turns or tilts with respect to the workpiece, it is sometimes impossible to carry out accurate painting of the workpiece by the roller, disadvantageously.

An aspect of the present invention was made in view of the above problem, and has an object to provide an automatic application device that enables automatic and accurate application of a liquid and an automatic application method carried out by the automatic application device.

Solution to Problem

An automatic application device in accordance with an aspect of the present invention made to attain the above object includes: a robot arm; an application hand attached to the robot arm, the application hand being configured to apply a liquid to a workpiece; a force sensor configured to detect a force and a moment acting on the application hand; and a control section configured to control the robot arm in accordance with a parameter calculated from an output signal from the force sensor.

An automatic application method in accordance with an aspect of the present invention is an automatic application method for applying a liquid to a workpiece with use of an automatic application device that includes a robot arm, an application hand attached to the robot arm, and a force sensor configured to detect a force and a moment acting on the application hand, the automatic application method including: controlling the robot arm in accordance with a parameter calculated from an output signal from the force sensor.

With the automatic application device or the automatic application method, it is possible to accurately control a robot arm having an application hand attached thereto, in accordance with a parameter calculated from an output signal from a force sensor that detects a force and a moment applied to the application hand. Consequently, it is possible to carry out, by the application hand, automatic and accurate application of a liquid to a workpiece.

Advantageous Effects of Invention

An aspect of the present invention enables automatic and accurate application of a liquid.

DESCRIPTION OF EMBODIMENTS

Embodiment 1

Figure 1:
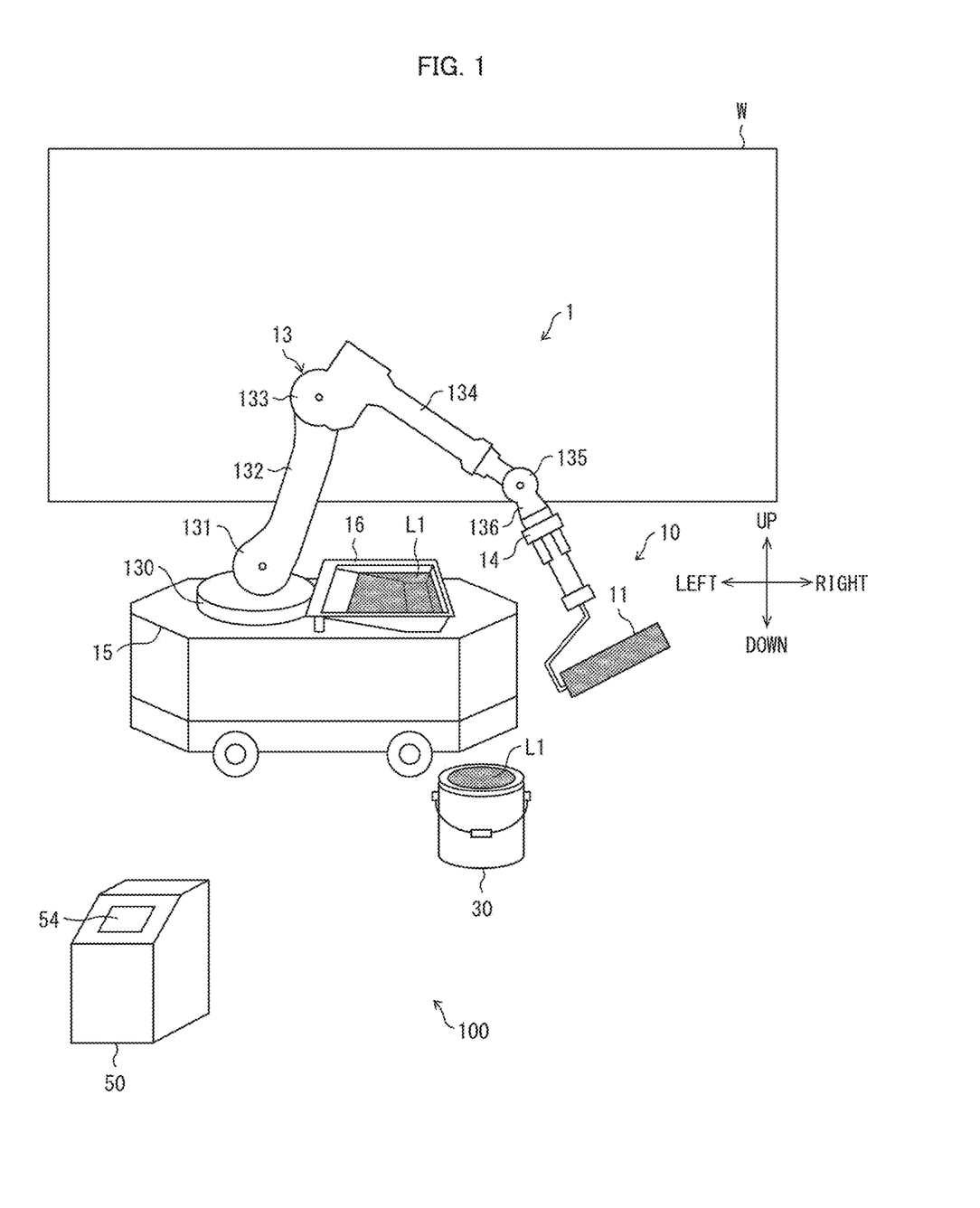
FIG. 1 is a perspective view illustrating a configuration of an automatic application system in accordance with Embodiment 1 of the present invention.

The following description will discuss, with reference to FIGS. 1 to 10, an automatic application system 100 including an automatic application device 1 in accordance with Embodiment 1 of the present invention. FIG. 1 is a perspective view illustrating a configuration of the automatic application system 100 in accordance with Embodiment 1 of the present invention.

As shown in FIG. 1, the automatic application system 100 includes the automatic application device 1 and a control device 50. The automatic application system 100 is controlled by the control device 50 such that the automatic application system 100 automatically applies a paint L1, which is an example of a liquid, to a workpiece W such as a wall. The automatic application device 1 includes an application hand 10, a robot arm 13, a force sensor 14, an automatic guided vehicle (AGV) 15, and a storage section 16. Note that the automatic application system 100 may include a plurality of automatic application devices 1. The workpiece W is not limited to the wall or the like having a flat surface, and may alternatively be a structure or a machined object that is three-dimensional and has an uneven surface.

The application hand 10 is a member that includes a painting roller 11 and that uses the painting roller 11 to apply the paint L1 to the workpiece W. The application hand 10 is attached to the robot arm 13 via the force sensor 14.

The robot arm 13 is mounted on the AGV 15. The AGV 15, which is an example of an automatic conveying device, is configured to be capable of traveling along a fixed route defined by a guide material such as a magnetic tape. Note that an autonomous mobile robot (AMR) may be used in place of the AGV 15. In this case, even without the guide material such as a magnetic tape, the AMR can travel autonomously along a route automatically calculated in accordance with surrounding environment and can move the robot arm 13. The robot arm 13 may be provided with a camera, and may be controlled with use of image information obtained by the camera.

The robot arm 13 is an articulated robot, and includes a base portion 130, a first joint 131 provided to the base portion 130, a first arm 132, a second joint 133, a second arm 134, a third joint 135, and a third arm 136.

The base portion 130 is fixed to the AGV 15 such that the base portion 130 is rotatable about a rotational axis perpendicular to the AGV 15. The base portion 130 is provided with the first joint 131. The first joint 131 is connected to a first end of the first arm 132. As a result of movement of the first joint 131, the first arm 132 can change an angle made by the first arm 132 and the base portion 130.

The first arm 132 has a second end connected with a first end of the second arm 134 via the second joint 133. As a result of movement of the second joint 133, the second arm 134 can change an angle made by the second arm 134 and the first arm 132.

The second arm 134 has a second end connected with a first end of the third arm 136 via the third joint 135. As a result of movement of the third joint 135, the third arm 136 can change an angle made by the third arm 136 and the second arm 134. The third arm 136 constitutes a distal end portion of the robot arm 13. The first joint 131, the second joint 133, and the third joint 135 are controlled by the robot controller 20.

Figure 2:
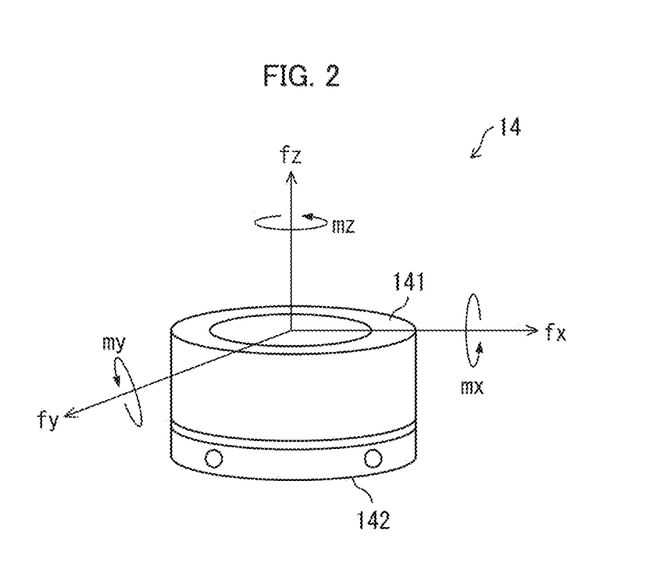
FIG. 2 is a perspective view illustrating directions of forces and moments to be detected by a force sensor included in an automatic application device shown in FIG. 1.

FIG. 2 is a perspective view illustrating directions of forces and moments to be detected by the force sensor 14 included in the automatic application device 1 shown in FIG. 1. As shown in FIG. 2, the force sensor 14 includes a first member having a first surface 141, a second member having a second surface 142, and a strain element (not illustrated) disposed between the first member and the second member. The first surface 141 of the force sensor 14 is attached to the third arm 136 of the robot arm 13, and the second surface 142 of the force sensor 14 is attached to the application hand 10.

As shown in FIG. 1, the force sensor 14 is disposed between the robot arm 13 and the application hand 10. The force sensor 14 is configured to detect deformation of the strain element inside the force sensor 14 so as to detect (i) magnitudes of forces (fx, fy, fz) acting on the force sensor 14 in directions of three axes (x-axis, y-axis, z-axis) and (ii) magnitudes of moments (mx, my, mz) about these axes (see FIG. 2). The force sensor 14 detects the forces and moments applied by the workpiece W through the application hand 10, and outputs the forces and moments to the robot controller 20.

Figure 3:
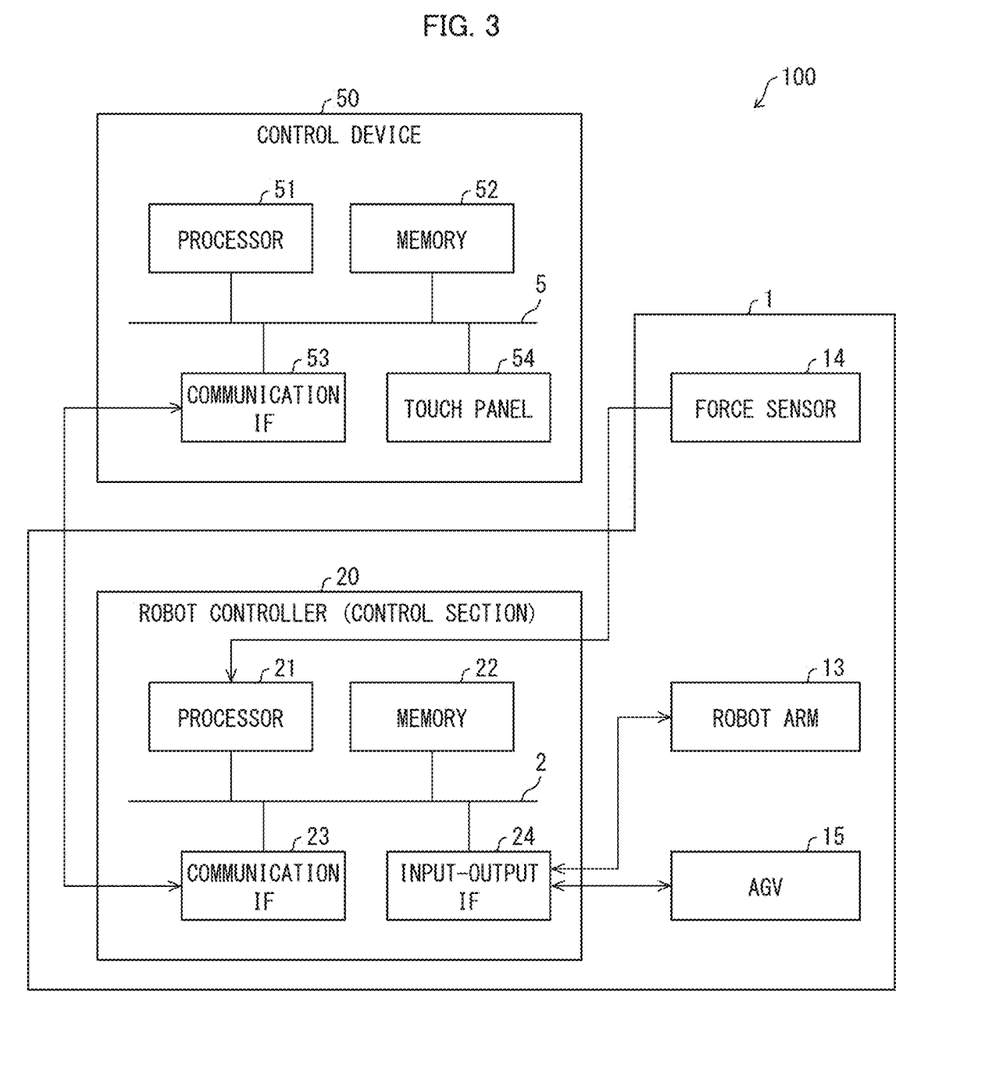
FIG. 3 is a block diagram illustrating a configuration of the automatic application device and a control device included in the automatic application system shown in FIG. 1.

FIG. 3 is a block diagram of the automatic application system 100 including the automatic application device 1 in accordance with Embodiment 1. As shown in FIG. 3, the automatic application device 1 includes the robot controller 20. The robot controller 20 is an example of the control section. The robot controller 20 includes a processor 21, a memory 22, a communication interface (IF) 23, and an input-output interface (IF) 24. The processor 21, the memory 22, the communication IF 23, and the input-output IF 24 are connected to one another through a bus 5. Note that the control device 50 may be configured to have the function of the robot controller 20, and may be used as the control section.

In accordance with an output signal from the force sensor 14, the processor 21 of the robot controller 20 calculates forces (FX, FY, FZ) and moments (MX, MY, MZ) applied to the painting roller 11 of the application hand 10 by the workpiece W. The processor 21 controls the robot arm 13 and the AGV 15 in accordance with the parameters (FX, FY, FZ, MX, MY, MZ) thus calculated. A device that can be used as the processor 21 may be, for example, a central processing unit (CPU), a graphic processing unit (GPU), a digital signal processor (DSP), a micro processing unit (MPU), or a combination of them.

The memory 22 stores therein a program and/or the like used to control actions of the robot arm 13 and the AGV 15. The processor 21 controls actions of the robot arm 13 and the AGV 15 in accordance with an instruction included in the program stored in the memory 22.

The communication IF 23 is an interface used to communicate with the control device 50. Specific examples of the communication IF 23 encompass interfaces such as Ethernet (registered trademark) and Wi-Fi (registered trademark). The control device 50 may be connected to the input-output IF 24.

The input-output IF F24 is electrically connected to the robot arm 13 and the AGV 15 via their respective driving sections (not illustrated). The robot controller 20 controls actions of the robot arm 13 and the AGV 15 via the input-output IF 24. Examples of the input-output IF 24 encompass universal serial bus (USB), advanced technology attachment (ATA), small computer system interface (SCSI), and a serial communication interface. The robot arm 13 and/or the AGV 15 may be connected to the communication IF 23 via a driving section(s).

The control device 50 is a device that teaches the later-described application program to the robot controller 20. The control device 50 includes a processor 51, a memory 52, a communication IF 53, and a touch panel 54. The processor 51, the memory 52, the communication IF 53, and the touch panel 54 are connected to one another through a bus 2. The processor 51 is configured similarly to the processor 21.

The memory 52 stores therein information such as a program to be executed by the processor 51, various data (e.g., density, viscosity coefficient) corresponding to a kind of the paint L1, and various data (e.g., coefficient of kinetic friction) corresponding to a material of the workpiece W.

The communication IF 53 is an interface used to communicate with the robot controller 20. The touch panel 54 includes an operation panel to be used by a user to carry out various settings (see FIG. 1). The user can operate the touch panel 54 to carry out the later-described setting step S1. The touch panel 54 may alternatively be provided to the robot controller 20.

Automatic Application Method

Figure 7:
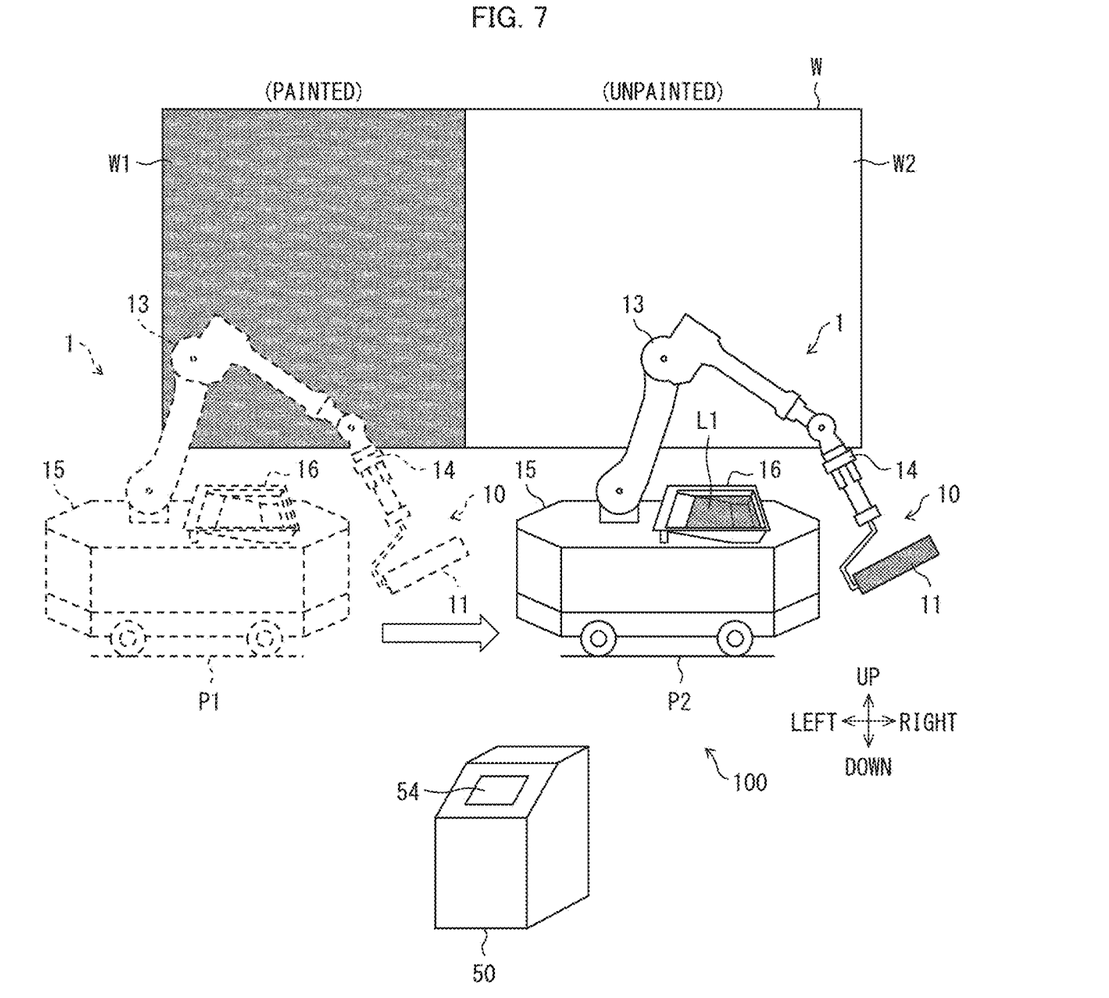
FIG. 7 is a perspective view illustrating a state in which the automatic application device shown in FIG. 1 is conveyed by an AGV.
Figure 8:
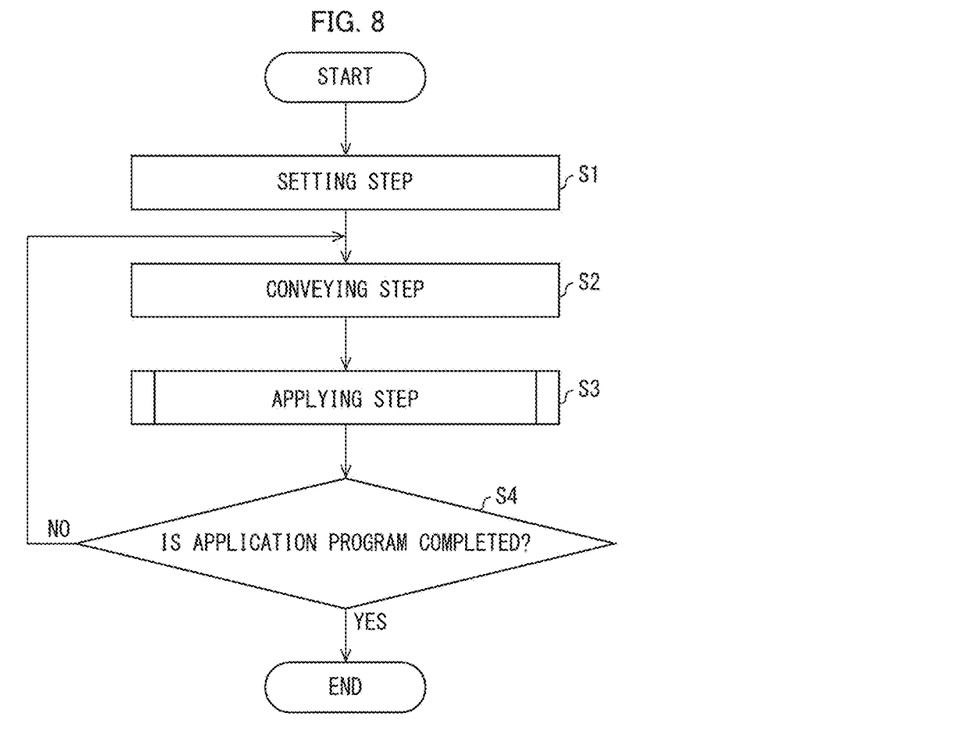
FIG. 8 is a flowchart illustrating a flow of an automatic application method involving use of the automatic application device in accordance with Embodiment 1.

Next, the following description will discuss, with reference to the flowcharts shown in FIGS. 7 and 8 to 10, an automatic application method involving use of the automatic application device 1 in accordance with Embodiment 1. FIG. 8 is a flowchart illustrating a flow of the automatic application method carried out by the automatic application device 1 in accordance with Embodiment 1. In the automatic application method in accordance with Embodiment 1, the control device 50 first carries out the setting step (S1) of setting an application program for the automatic application device 1, as indicated in the flowchart shown in FIG. 8. Then, the automatic application device 1 carries out a conveying step (S2) and an applying step (S3) sequentially. Thereafter, the automatic application device 1 judges whether or not the application program is completed (S4). S2 and S3 are repeatedly carried out until the application program set in S1 is completed (S4: YES). The following description will discuss these steps in detail.

In the setting step S1, the control device 50 sets the application program for the automatic application device 1. The "application program" is a program used by the automatic application device 1 to execute application of the paint L1 under a certain application condition. The process to "set the application program" refers to a process of (1) determining or creating an application program to be applied to the automatic application device 1 and (2) transmitting, to the automatic application device, the application program thus determined or created.

Specifically, the control device 50 first determines an application condition of the automatic application device 1 in accordance with user's input operation on the touch panel 54. The "application condition" includes a kind of the paint L1, a size of the workpiece W, a material of the workpiece W, and/or the like. The control device 50 determines or creates an application program corresponding to the application condition thus determined. The control device 50 may determine an application program by selecting one of the application programs stored in the memory 52 in advance. Alternatively, the control device 50 may create an application program by selecting, from program patterns stored as templates in the memory 52 in advance, patterns corresponding to the application condition and combining the selected patterns.

Note that the control device 50 may determine a threshold corresponding to the application condition. The determination of the threshold and the determination or creation of the application program may be carried out in any order. For example, different kinds of paints L1 have different viscosity coefficients and cause different frictional forces FX at the time of application. Thus, the control device 50 may determine the threshold of the frictional force FX in accordance with the kind of the paint L1. This threshold is used in the later-described judging step S13.

The application program may include, in addition to a program specifying an action of the robot arm 13, a program specifying an action of the AGV 15. By causing the robot arm 13 and the AGV 15 to cooperate with each other, it is possible to suitably apply the paint L1 even to a subject a whole of which cannot be painted with the paint L1 solely by operation of the robot arm 13.

The control device 50 transmits the application program to the automatic application device 1 via the communication IF 53. The processor 21 of the automatic application device 1 receives the application program via the communication IF 23, and stores the application program in the memory 22. The processor 21 reads out and executes the application program as appropriate, so as to execute the subsequent steps, i.e., the conveying step (S2), the applying step (S3), and a painting step (S11).

After S1, the conveying step is carried out (S2). FIG. 7 is a view illustrating a state in which the automatic application device 1 shown in FIG. 1 is conveyed by the AGV 15. In the conveying step S2, the robot controller 20 first causes the AGV 15 located at a preset initial position (not illustrated) to move to an application start position P1 (see the broken lines in FIG. 7). Consequently, the painting roller 11 of the robot arm 13 is ready to carry out application of the paint L1. Note that the process in S2 is not essential. For example, in a case where the application program does not specify a motion of the AGV 15, the conveying step S2 to be carried out by the AGV 15 may be omitted.

Figure 9:
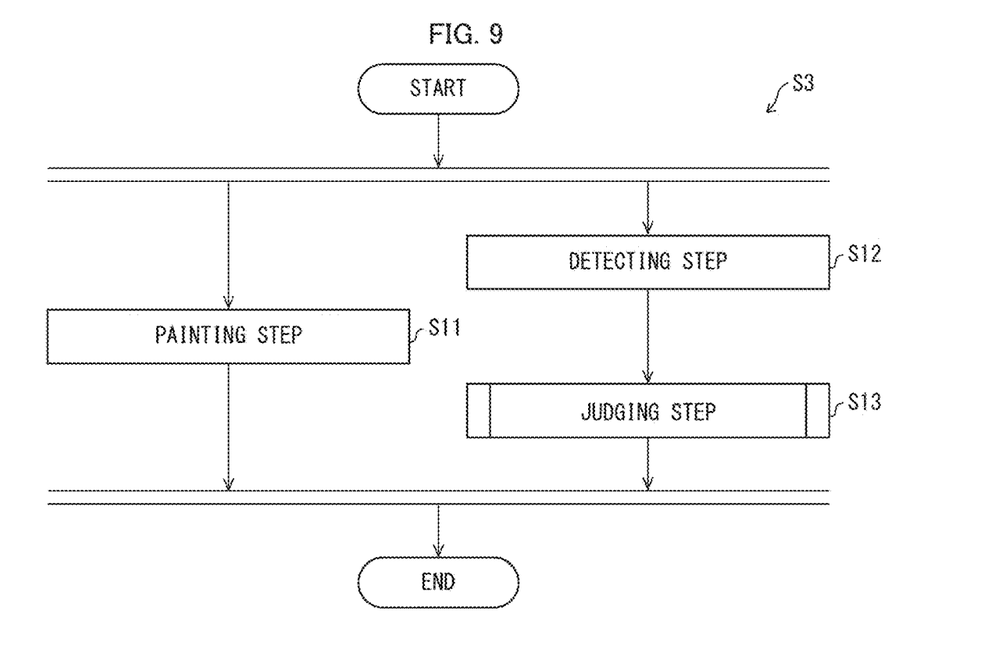
FIG. 9 is a flowchart illustrating a flow of an applying step included in the automatic application method shown in FIG. 8.

Then, the applying step is carried out (S3). FIG. 9 is a flowchart illustrating a flow of the applying step S3. The applying step S3 includes the painting step (S11), a detecting step (S12), and the judging step (S13) that are carried out in parallel or in any order.

Figure 4:
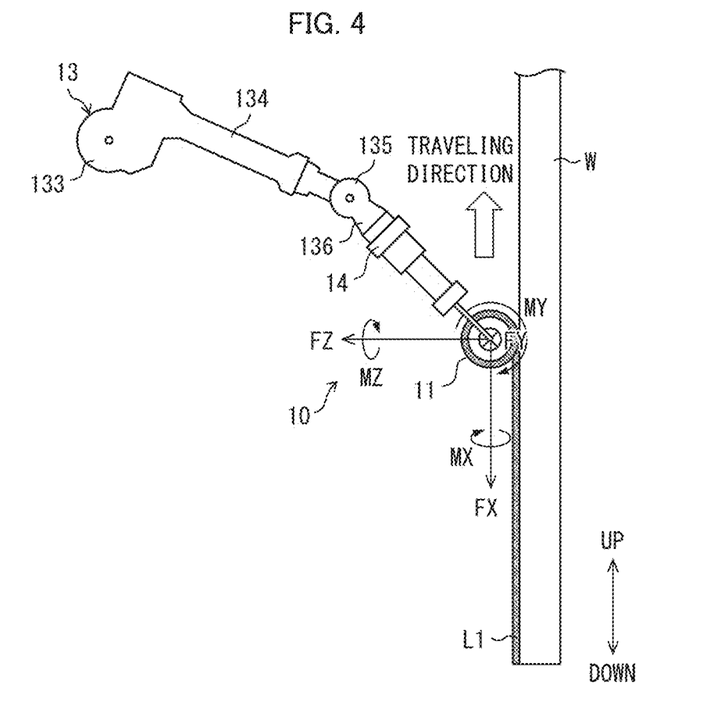
FIG. 4 is a side view illustrating a state in which an application hand of the automatic application device shown in FIG. 1 applies a paint to a workpiece.

In the painting step (S11), the robot controller 20 controls the robot arm 13 via the input-output IF 24 to roll the painting roller 11 on the workpiece W1 in a state in which the painting roller 11 is in contact with the workpiece W1, thereby applying the paint L1 (see FIG. 4). FIG. 4 is a side view illustrating a state in which the application hand 10 of the automatic application device 1 shown in FIG. 1 applies the paint L1 to the workpiece W. In the example shown in FIG. 4, the painting roller 11 is caused to travel toward an upper side of the workpiece W, so that the paint L1 is applied to the workpiece W.

When the painting roller 11 moves in a traveling direction (see the arrow in FIG. 4), a frictional force FX acts on the painting roller 11 in a direction opposite to the traveling direction. When the painting roller 11 presses the workpiece W with a given pressing force, a normal reaction FZ acts on the painting roller 11. In this manner, the application hand 10 receives forces and moments from the workpiece W, and the forces and moments are applied to the force sensor 14. The force sensor 14 detects the forces (fx, fy, fz) and moments (mx, my, mz) applied by the workpiece W through the application hand 10, and outputs the forces and moments to the robot controller 20 (see FIG. 3).

In the detecting step (S12), in accordance with output signals (fx, fy, fz, mx, my, mz) from the force sensor 14, the robot controller 20 calculates forces (FX, FY, FZ) and moments (MX, MY, MZ) acting on the painting roller 11 of the painting roller 10. In Embodiment 1, the robot controller 20 calculates at least a frictional force FX, a normal reaction FZ, a first turning moment MX, and a second turning moment MZ applied to the application hand 10 by the workpiece W.

Figure 5:
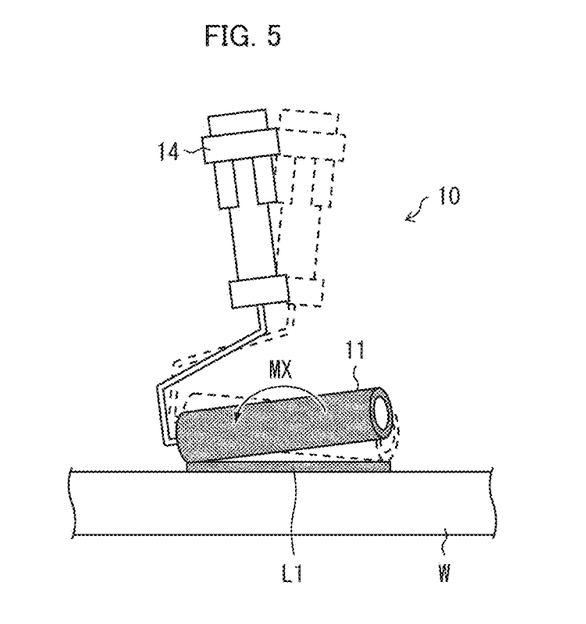
FIG. 5 is a side view illustrating a state in which the application hand of the automatic application device shown in FIG. 1 turns (tilts) about a rotational axis that is horizontal to the workpiece.

FIG. 5 is a view illustrating a state in which the application hand 10 shown in FIG. 4 turns about a rotational axis that is horizontal to the workpiece W. As shown in FIG. 5, the robot controller 20 calculates the first turning moment MX that causes the application hand 10 to turn about a rotational axis that is horizontal to an application surface of the workpiece W.

Figure 6:
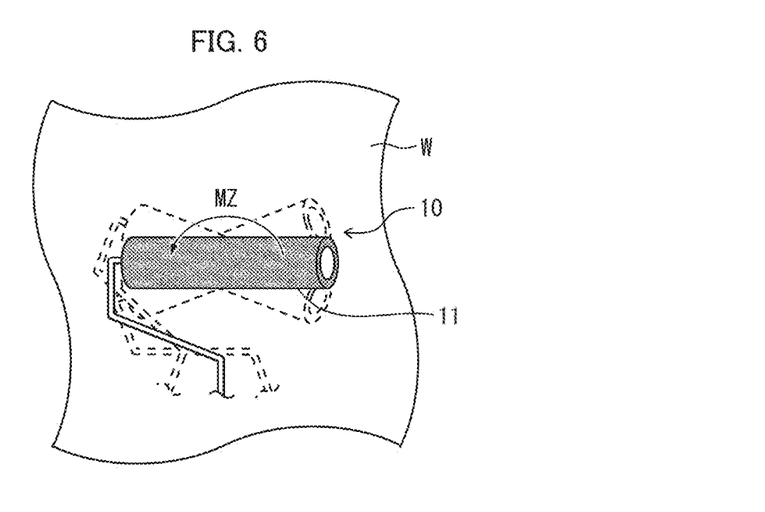
FIG. 6 is a plan view illustrating a state in which the application hand of the automatic application device shown in FIG. 1 turns (tilts) about a rotational axis that is perpendicular to the workpiece.

FIG. 6 is a view illustrating a state in which the application hand 10 shown in FIG. 4 turns about a rotational axis that is perpendicular to the workpiece W. As shown in FIG. 6, the robot controller 20 calculates the second turning moment MZ that causes the application hand 10 to turn about a rotational axis that is perpendicular to the application surface.

In the judging step (S13), the robot controller 20 judges whether or not the parameters (e.g., FX, FZ, MX, and MZ) calculated in the detecting step S12 satisfy a given condition. Specifically, the robot controller 20 determines whether or not the parameters satisfy given conditions in S21 to S23 shown in FIG. 10.

Figure 10:
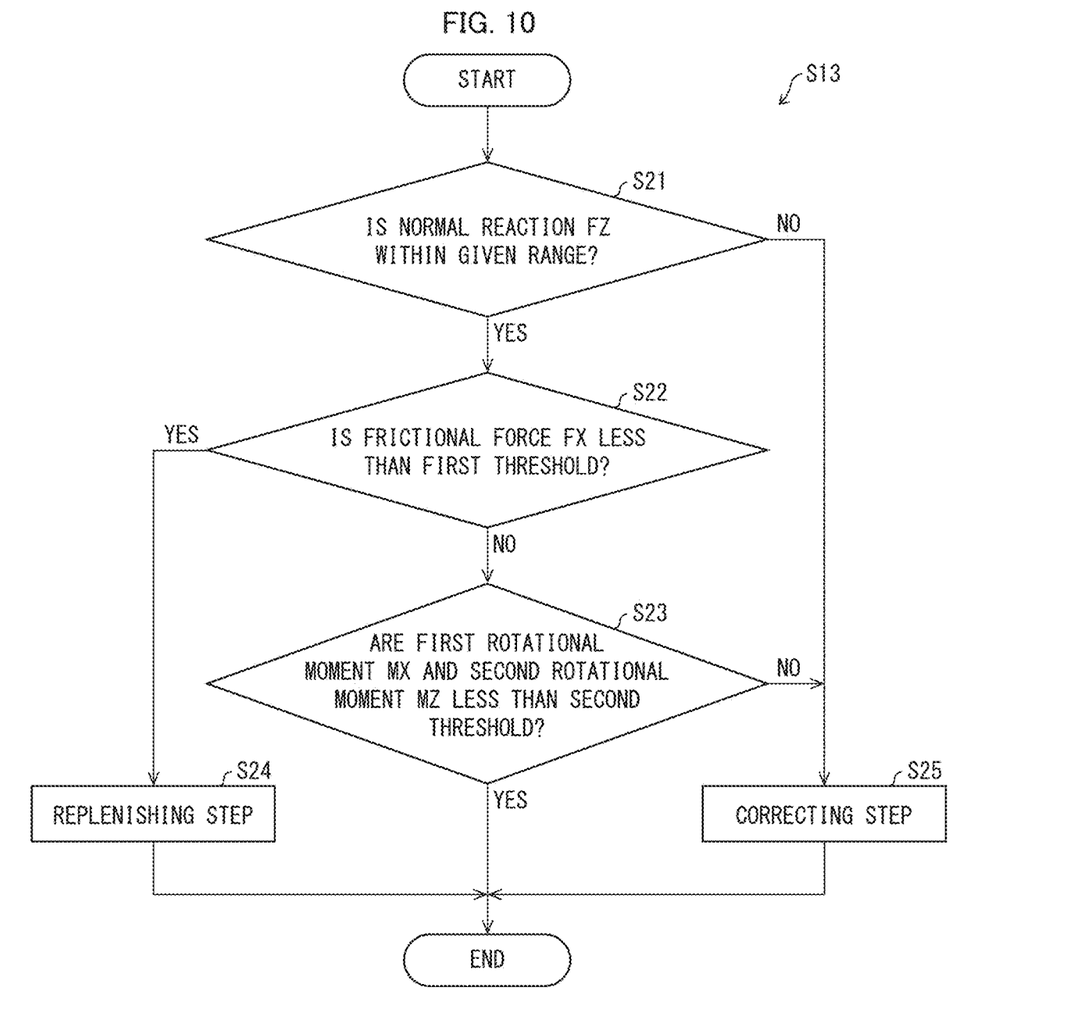
FIG. 10 is a flowchart illustrating a flow of a judging step included in the applying step shown in FIG. 9.

FIG. 10 is a flowchart illustrating a flow of the judging step S13 included in the applying step S3 shown in FIG. 9. In the judging step S13 shown in FIG. 10, the robot controller 20 first judges whether or not the normal reaction FZ shown in FIG. 4 is within a given range (S21). Here, assume that the "given range" is set in accordance with the kind of the paint L1, the material of the workpiece W, the material of the painting roller 11, and/or the like.

If the normal reaction FZ is within the given range (S21: YES), the robot controller 20 advances to S22. Meanwhile, if the normal reaction FZ is outside the given range (S21: NO), the robot controller 20 carries out a correcting step (S25). In the correcting step S25, the robot controller 20 controls the posture of the robot arm 13 so that the normal reaction FZ falls within the given range.

In a case where a value of the normal reaction FZ is too high, for example, it is presumed that the robot arm 13 is pressing the painting roller 11 onto the workpiece W too strongly. Thus, in such a case, the robot controller 20 adjusts the position and angle of the painting roller 11 so as to reduce a pressing force applied to the workpiece W by the painting roller 11. With this, it is possible to reduce the value of the normal reaction FZ.

In a case where a value of the normal reaction FZ is too low, for example, it is presumed that the painting roller 11 is not sufficiently pressed onto the workpiece W. Thus, in such a case, the robot controller 20 adjusts the position and angle of the painting roller 11 so as to increase a pressing force given by the painting roller 11 with respect to the workpiece W. With this, it is possible to increase the value of the normal reaction FZ.

Consequently, a force with which the application hand 10 presses the painting roller 11 onto the workpiece W can be kept constant, and accordingly the liquid L such as a paint can be uniformly applied to the workpiece W.

Furthermore, even in a case where the application surface of the workpiece W is uneven, it is possible to apply the paint L1 thereto so as to form a film with a uniform thickness.

Thereafter, the robot controller 20 judges whether or not the frictional force FX is less than a first threshold (S22). Assume that the first threshold is set in accordance with a remaining level, a viscosity coefficient, and/or the like of the paint L1. Note that, as described above, the first threshold used herein may be a threshold that is determined in the setting step S1 and transmitted to the robot controller 20.

If the frictional force FX is less than the first threshold (S22: YES), the processor 21 determines that the paint L1 in the painting roller 11 is run out, and carries out a replenishing step of replenishing the application hand 10 with the paint L1 (S24). Meanwhile, if the frictional force FX is not less than the first threshold (S22: NO), i.e., if the frictional force FX is equal to or higher than the first threshold, the processor 21 advances to S23.

Specifically, in the replenishing step S24, the processor 21 controls the robot arm 13 to cause the application hand 10 to move to a position of the storage section 16 shown in FIG. 1 so that the painting roller 11 is replenished with the paint L1 stored in the storage section 16. With this, when the painting roller 11 runs out of the paint L1, it is possible to quickly replenish the painting roller 11 with the paint L1. In a case where the paint L1 in the storage section 16 is run out, a paint L1 in a paint can 30 is poured into the storage section 16 by a user.

Next, in S23, the processor 21 judges whether or not the first turning moment MX and the second turning moment MZ are less than a second threshold. In S23, if the first turning moment MX and the second turning moment MZ are not less than the second threshold (S23: NO), i.e., if the first turning moment MX and the second turning moment MZ are equal to or higher than the second threshold, the processor 21 carries out the correcting step (S25).

For example, if a value of the first turning moment MX is too high, the painting roller 11 may possibly be lifted off from the workpiece W as shown in FIG. 5 and fail to carry out uniform painting. Thus, if the value of the first turning moment MX is equal to or higher than the second threshold, the robot controller 20 adjusts the position and/or angle of the painting roller 11 so that the painting roller 11 moves in a direction substantially opposite to a turning direction of the first turning moment MX. With this, it is possible to reduce the value of the first turning moment MX.

For another example, if a value of the second turning moment MZ is too high, the painting roller 11 may possibly move up and down over the workpiece W as shown in FIG. 6, thereby failing to carry out uniform painting. Thus, if the value of the second turning moment MZ is equal to or higher than the second threshold, the robot controller 20 adjusts the position and/or angle of the painting roller 11 so that the painting roller 11 moves in a direction substantially opposite to a turning direction of the second turning moment MZ. With this, it is possible to reduce the value of the second turning moment MZ.

In the correcting step S25, the processor 21 corrects the posture of the robot arm 13 so that the first turning moment MX and the second turning moment MZ are less than the second threshold. As described above, this step reduces turning of the application hand 10 about the rotational axis that is horizontal to the application surface of the workpiece W and turning of the application hand 10 about the rotational axis that is perpendicular to the application surface of the workpiece W. This makes it possible to carry out accurate painting of the workpiece W while increasing a contact area between the application hand 10 and the workpiece W.

Meanwhile, if the first turning moment MX and the second turning moment MZ are less than the second threshold (S23: YES), the robot controller 20 ends the judging step S13 shown in FIG. 10. Meanwhile, when S24 or S25 is completed, the robot controller 20 ends the judging step S13 shown in FIG. 10. When the judging step S13 and the painting step S11 in FIG. 9 end, the robot controller 20 ends the applying step S3 shown in FIG. 9.

Note that the judgment regarding the condition in S21, the judgment regarding the condition in S22, and the judgment regarding the condition in S23 may be carried out in any order. The judgment regarding the condition in S22 may be carried out prior to the judgment regarding the condition in S21 and the judgment regarding the condition in S23. In this case, if YES in S22, the replenishing step S24 may be executed and thereafter the judgment regarding the condition in S21 and the judgment regarding the condition in S23 may be carried out. Alternatively, the judgment regarding the condition in S21 and the judgment regarding the condition in S23 may be carried out prior to the judgment regarding the condition in S22. In this case, if NO in S21 and S23, the correcting step S25 may be carried out for each of S21 and S23 and thereafter next judgment regarding the condition in S22 may be carried out. Then, the replenishing step in S24 may be carried out at the end.

Next, in the flowchart shown in FIG. 8, the robot controller 20 judges, in S4, whether or not the application program having been set is completed. If the application program is not completed (S4: NO), the robot controller 20 goes back to S2 and carries out the conveying step. In the conveying step S2, as shown in FIG. 7, the robot controller 20 controls the AGV 15 to cause the entire robot arm 13 to move rightward relative to the workpiece W so that the robot arm 13 moves from the application start position P1 to an application position P2. Note that, depending on the specification of the application program, the AGV 15 may not carry out any action. For example, in a case where painting is to be carried out in a range where the robot arm 13 can reach, the step of S2 may be omitted.

Then, in the applying step S3, the robot controller 20 causes the automatic application device 1 to apply the paint L1 to a workpiece W2 having not been painted yet, in a similar manner to that carried out for the workpiece W1 having been painted. In this manner, the robot arm 13 is conveyed by the AGV 15 as necessary, and then application of the paint is carried out. Repeating this operation allows the application hand 10 to apply the paint over a wide area of the workpiece W.

After S3, the robot controller 20 judges again whether or not the application program is completed (S4). When the application program set in the setting step S1 is completed (S4: YES), the flow shown in FIG. 8 ends.

As described above, with the automatic application device 1 in accordance with Embodiment 1, it is possible to accurately control the robot arm 13 having the application hand 10 attached thereto, in accordance with the parameters (FX, FY, FZ, MX, MY, MZ) calculated from output signals (fx, fy, fz, mx, my, mz) from the force sensor 14. Consequently, automatic and accurate application of the paint L1, which is a liquid, to the workpiece W can be carried out by the application hand 10.

Embodiment 2

Figure 11:
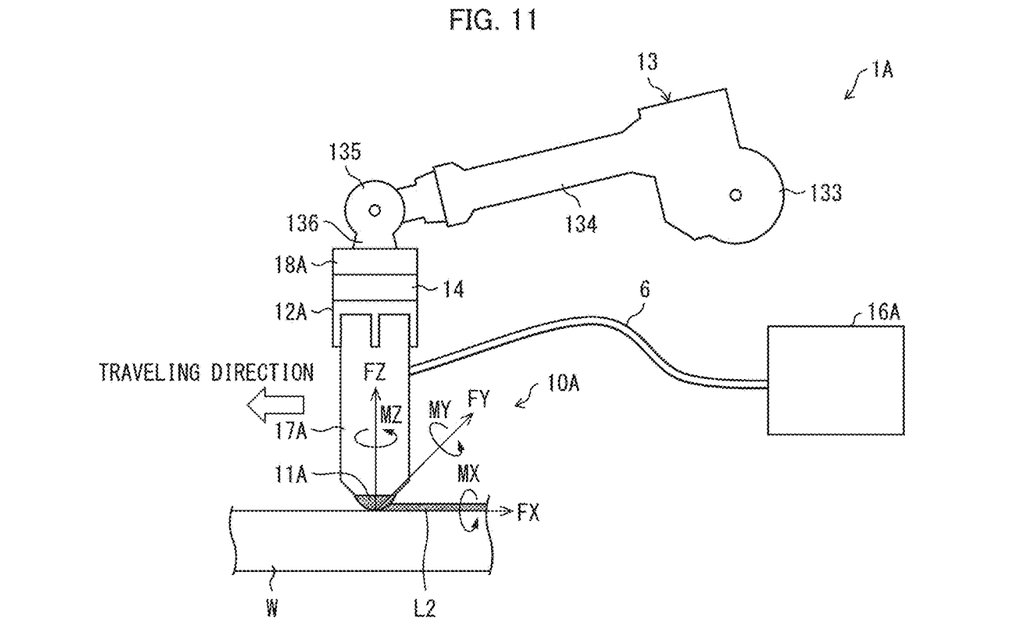
FIG. 11 is a side view illustrating a configuration of a main part of an automatic application device in accordance with Embodiment 2 of the present invention.
Figure 12:
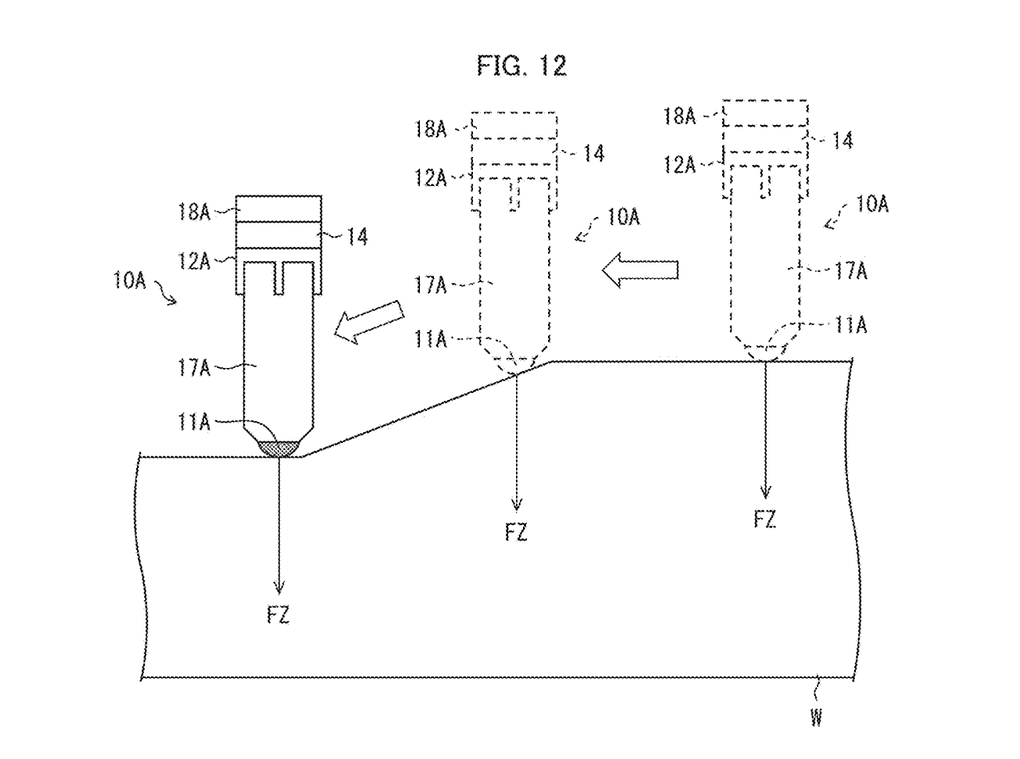
FIG. 12 is a side view illustrating a state in which an application hand of the automatic application device shown in FIG. 11 applies an adhesive.
Figure 13:
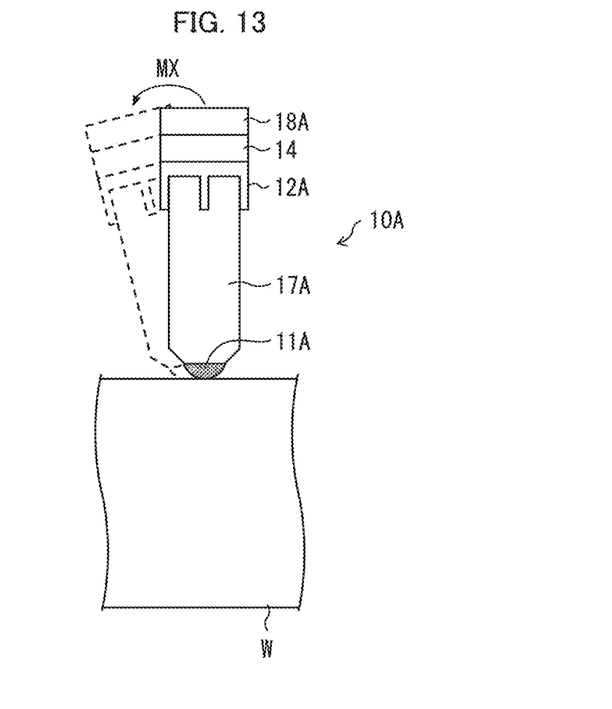
FIG. 13 is a side view illustrating a state in which the application hand of the automatic application device shown in FIG. 11 turns about a rotational axis that is horizontal to a workpiece.

Next, the following description will discuss, with reference to FIGS. 11 to 13, an application hand 10A of an automatic application device 1A in accordance with Embodiment 2 of the present invention. For convenience of description, a member having a function identical to that of a member discussed in Embodiment 1 above is given an identical reference sign, and a description thereof is omitted.

FIG. 11 is a side view illustrating a configuration of a main part of the automatic application device 1A in accordance with Embodiment 2. FIG. 12 is a side view illustrating a state in which the application hand 10A of the automatic application device 1A shown in FIG. 11 applies an adhesive L2. FIG. 13 is a side view illustrating a state in which the application hand 10A of the automatic application device 1A shown in FIG. 11 turns about a rotational axis that is horizontal to a workpiece W.

As shown in FIG. 11, the automatic application device 1A in accordance with Embodiment 2 includes the application hand 10A, a robot arm 13, a force sensor 14, and a storage section 16A. The application hand 10A includes a painting roller 11A, a syringe 17A, a first attachment portion 12A, and a second attachment portion 18A. The first attachment portion 12A and the second attachment portion 18A are examples of the attachment portion. Note that the robot arm 13 may be mounted to the AGV 15.

The painting roller 11A is a roller member used to apply the adhesive L2, which is an example of the liquid, to the workpiece W such as a machined object. The painting roller 11A is in the shape of a disk, for example. The painting roller 11A is rotatably attached to a distal end portion of the syringe 17A. The first attachment portion 12A and the second attachment portion 18A are members via which the syringe 17A is attached to the robot arm 13. The force sensor 14 is interposed between the first attachment portion 12A and the second attachment portion 18A.

The force sensor 14 detects forces fx, fy, fz and moments mx, my, mz acting on the syringe 17A (see FIG. 2). In accordance with a detection signal from the force sensor 14, the robot controller 20 calculates the forces FX, FY, FZ and the moments MX, MY, MZ acting on the painting roller 11A (see FIG. 11).

The syringe 17A is a container in which an adhesive is stored, and is connected to the storage section 16A via a supply tube 6. When a remaining level of the adhesive L2 in the syringe 17A becomes low, the adhesive L2 is supplied to the syringe 17A from the storage section 16A.

Automatic Application Method

Next, the following description will discuss, with reference to the flowcharts shown in FIGS. 8 to 10, an automatic application method involving use of the automatic application device 1A in accordance with Embodiment 2. The following description will not deal with a step having a feature identical to that in the automatic application method to be carried out by the automatic application device 1 in accordance with Embodiment 1, but will discuss only a step having a feature different from that in the automatic application method to be carried out by the automatic application device 1 in accordance with Embodiment 1.

In the flowchart shown in FIG. 8, in a setting step S1, a user operates a touch panel 54 to set application conditions including a kind of an adhesive L2, a size of a workpiece W, and a material of the workpiece W. Assume that a memory 52 stores therein various data such as a viscosity coefficient corresponding to the kind of the adhesive L2 and/or a friction coefficient corresponding to the material of the workpiece W (see FIG. 3). The processor 51 refers to the application conditions set via the touch panel 54 and the various data stored in the memory 52 so as to change a threshold and/or the like to be used in an applying step S3.

Then, the processor 21 controls the robot arm 13 to carry out a conveying step of positioning the robot arm 13 at an application start position P1 of the workpiece W (S2) and to carry out an applying step shown in FIG. 9 in a similar manner to Embodiment 1 (S3). By repeating the conveying step S2 and the applying step S3 until the application program is completed, the automatic application device 1A can automatically apply the adhesive L2 over a wide area. Note that the AGV 15 may be used to cause the robot arm 13 move to the application start position P1.

In S21 in the judging step S13 shown in FIG. 10, the processor 21 judges whether or not a normal reaction FZ is within a given range. If the normal reaction FZ is outside the given range (S21: NO), the processor 21 carries out a correcting step (S25). In the correcting step S25, the processor 21 controls the posture of the robot arm 13 so that the normal reaction FZ falls within the given range.

Consequently, as shown in FIG. 12, a pressing force FZ with which the application hand 10A is pressed onto the workpiece W can be kept constant, and accordingly the adhesive L2 can be applied to the workpiece W so as to form a film with a uniform thickness. In addition, even in a case where the workpiece W has an inclined surface, it is possible to control the posture of the robot arm 13 so that the robot arm 13 conforms to the surface of the workpiece W. Consequently, it is possible to apply the adhesive L2 uniformly on the surface of the workpiece W.

If a frictional force FX is less than a first threshold in S22 in FIG. 10 (S22: YES), the processor 21 determines that the adhesive L2 in the syringe 17A is run out. Then, in the replenishing step S24, a supply mechanism (not illustrated) provided to the storage section 16A is driven so that the adhesive L2 in the storage section 16A is supplied to the syringe 17A via the supply tube 6. With this, it is possible to quickly replenish the painting roller 11A with the adhesive L2. Note that the supply mechanism includes a pump, a valve, and/or the like. If there occurs a trouble such as clogging of the adhesive L2 in a passage through which the adhesive L2 is supplied from the syringe 17A to the painting roller 11A, the processor 21 may determine, in S24, the occurrence of the trouble and notify a worker of the occurrence of the error.

Even in a case where a moment MX acts on the application hand 10A and the application hand 10A tilts relative to the workpiece W as shown in FIG. 13, it is possible to reduce, through the judging in S22 and the correcting step S25 shown in FIG. 10, the degree of turning of the application hand 10A, thereby maintaining a state where the syringe 17A is positioned perpendicularly to the workpiece W. This allows the painting roller 11A to accurately apply the adhesive L2 to the workpiece W.

Embodiment 3

Figure 14:
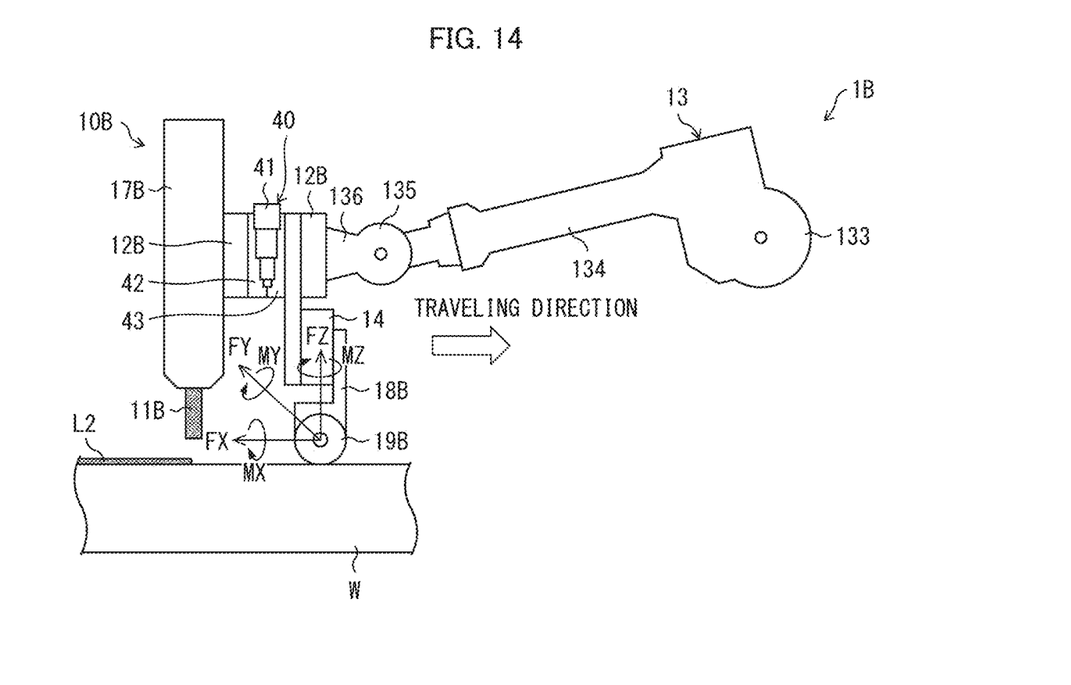
FIG. 14 is a side view illustrating a configuration of a main part of an automatic application device in accordance with Embodiment 3 of the present invention.

Next, the following description will discuss, with reference to FIG. 14, an automatic application device 1B in accordance with Embodiment 3 of the present invention. For convenience of description, a member having a function identical to that of a member discussed in Embodiment 2 above is given an identical reference sign, and a description thereof is omitted.

FIG. 14 is a view schematically illustrating a configuration of a main part of the automatic application device 1B in accordance with Embodiment 3. As shown in FIG. 14, the automatic application device 1B in accordance with Embodiment 3 includes an application hand 10B including a syringe 17B having a side surface provided with an attachment portion 12B having a support bar 18B. The support bar 18B has a distal end to which a roller 19B is rotatably provided. The roller 19B, which can roll while being in contact with a workpiece W, has a function of assisting movement of the application hand 10B.

The syringe 17B has a distal end provided with a discharge section 11B through which the adhesive L2 is discharged. In a state where the roller 19B is in contact with the workpiece W, the discharge section 11B and the workpiece W have a vertical distance therebetween.

A force sensor 14 is interposed between the support bar 18B and the attachment portion 12B. In accordance with an output signal from the force sensor 14, a robot controller 20 can favorably calculate forces (FX, FY, FZ) and moments (MX, MY, MZ) applied to the application hand 10B by the workpiece W via the roller 19B.

The attachment portion 12B is provided with an adjusting section 40. The adjusting section 40 includes a micro-gauge 41, a first member 42, and a second member 43. The adjusting section 40 is structured to turn the micro-gauge 41 so that the first member 42 moves toward the second member 43 in a top-bottom direction in FIG. 14.

The first member 42 of the adjusting section 40 is connected to the syringe 17B via the attachment portion 12B. The second member 43 is connected to the robot arm 13 via the attachment portion 12B. With this, a worker can turn the micro-gauge 41 of the adjusting section 40 to minutely adjust the position of the syringe 17B oriented in a direction perpendicular to the workpiece W.

Automatic Application Method

Next, the following description will discuss, with reference also to the flowcharts shown in FIGS. 8 to 10, an automatic application method to be carried out by the automatic application device 1B in accordance with Embodiment 3. The following description will not deal with a step having a feature identical to that in the automatic application method to be carried out by the automatic application device 1B in accordance with Embodiment 2, but will discuss only a step having a feature different from that in the automatic application method to be carried out by the automatic application device 1B in accordance with Embodiment 2.

The processor 21 carries out a conveying step of causing the AGV 15 shown in FIG. 7 to move so that the robot arm 13 is positioned at an application start position P1 of the workpiece W (S2). Then, the processor 21 carries out an applying step shown in FIG. 9 in a similar manner to Embodiment 1 (S3). With this, the automatic application device 1B can automatically apply an adhesive L2 over a wide area. Alternatively, a user may use an automated guided vehicle or the like to cause the robot arm 13 to move to the application start position P1.

In Embodiment 3, if a frictional force FX is less than a first threshold in S22 in a judging step S13 in FIG. 10 (S22: YES), the processor 21 drives, in a replenishing step S24, a supply mechanism (not illustrated) provided to a storage section 16A so that the adhesive L2 in the storage section 16A is supplied to the syringe 17A via the supply tube 6. With this, it is possible to quickly replenish the painting roller 11A with the adhesive L2.

Even in a case the workpiece W has an inclined surface as shown in FIG. 12, the processor 21 controls, through the judging in S21 and the correcting step S25 shown in FIG. 10, an action of the robot arm 13 so that a pressing force FZ with which the painting roller 11A presses the workpiece W is made constant. With this, it is possible to uniformly apply the adhesive L2 to the workpiece W.

Even in a case where the application hand 10A tilts relative to an application surface of the workpiece W as shown in FIG. 13, it is possible to reduce, through the judging in S22 and the correcting step S25 shown in FIG. 10, turning of the application hand 10A. With this, it is possible to reliably apply the adhesive L2 to the workpiece W while increasing a contact area between the application hand 10A and the application surface.

Also with the automatic application device 1B in accordance with Embodiment 3 described above, it is possible to obtain similar effects to those of the automatic application device 1A in accordance with Embodiment 2. That is, with the automatic application device 1B, a distance between the discharge section 11B and the workpiece W can be kept constant, and accordingly the adhesive L2 can be applied to the workpiece W so as to form a film with a uniform thickness. Particularly, the automatic application device 1B can provide a space between the discharge section 11B and the workpiece W. This eliminates the need to bring the discharge section 11B into contact with the workpiece W in the applying step S3, thereby making it possible to apply the adhesive L2 in a favorable manner.

Furthermore, the automatic application device 1B includes, at a position between the robot arm 13 and the syringe 17B, the adjusting section 40 including the micro-gauge 41. With this, the worker can turn the micro-gauge 41 to minutely adjust the position of the syringe 17B oriented in a direction perpendicular to the workpiece W, thereby precisely adjusting an amount of the adhesive L2 applied through the discharge section 11B.

Other Embodiments

The automatic application device 1 in accordance with Embodiment 1 described above is configured to apply the paint L1 with use of the painting roller 11. However, this is not limitative. Alternatively, for example, the application may be carried out with use of a brush. The automatic application device 1 is configured to apply the paint L1 to the entire surface of the workpiece W as shown in FIG. 7. However, this is not limitative. Alternatively, for example, the paint L1 may be applied to a surface of a workpiece W such as a road to draw a line(s) and/or a character(s) thereon.

In Embodiments 1 to 3 described above, the processor 21 judges, in S22 in the judging step S13 shown in FIG. 10, whether or not the frictional force FX is less than the first threshold. However, this is not limitative. Alternatively, a plurality of thresholds may be set and judgment regarding the thresholds may be carried out in steps. Further alternatively, in a case where a workpiece W has a high frictional resistance and the frictional resistance of the workpiece W gives a greater effect on a frictional force FX than a viscosity coefficient of a paint L1 does, the processor 21 may determine, in S22, that the paint L1 is run out and may carry out the replenishing step S24, if the frictional force FX becomes equal to or higher than a given threshold.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST 1, 1A, 1B: automatic application device
10, 10A, 10B: application hand
11, 11A: painting roller
13: robot arm
14: force sensor
15: AGV (automatic conveying device)
16, 16A: storage section
17A, 17B: syringe
18B: support bar
20: robot controller (control section)
50: control device
100: automatic application system
W, W1, W2: workpiece
L1: paint
L2: adhesive
S1: setting step
S2: conveying step
S3: applying step
S11: painting step
S12: detecting step
S13: judging step
S24: replenishing step
S25: correcting step

The invention claimed is:

1. An automatic application device comprising:
a robot arm;
an application hand attached to the robot arm, the application hand being configured to apply a liquid to a workpiece;
a force sensor configured to detect a force and a moment acting on the application hand; and
a control section configured to control the robot arm in accordance with a parameter calculated from an output signal from the force sensor, wherein
the parameter includes
a normal reaction applied to the application hand by the workpiece, and
a frictional force applied to the application hand by the workpiece, and
the control section is further configured to control an action of the robot arm to make a magnitude of the normal reaction constant, and is further configured to replenish the application hand with the liquid, in a case where the frictional force is less than a first threshold.

2. The automatic application device as set forth in claim 1, further comprising:
a storage section in which the liquid is stored, wherein
the control section is further configured to cause the application hand to move to a position of the storage section so that the application hand is replenished with the liquid, in a case where the frictional force is less than the first threshold.

3. The automatic application device as set forth in claim 1, wherein
the parameter includes
a first turning moment causing the application hand to turn about a rotational axis that is horizontal to an application surface of the workpiece and
a second turning moment causing the application hand to turn about a rotational axis that is perpendicular to the application surface, and
the control section is further configured to control an action of the robot arm so that the first turning moment and the second turning moment are less than a second threshold.

4. The automatic application device as set forth in claim 1, further comprising:
an automatic conveying device configured to convey the robot arm.

5. The automatic application device as set forth in claim 1, wherein
the force sensor is disposed between the robot arm and the application hand.

6. The automatic application device as set forth in claim 1, wherein
the application hand includes
a syringe in which the liquid is stored and
an attachment portion via which the syringe is attached to the robot arm, and
the force sensor is provided to the attachment portion.

7. The automatic application device as set forth in claim 1, wherein the control section determines a threshold of the friction force in accordance with the kind of the liquid.

8. The automatic application device as set forth in claim 1, wherein the first threshold is set in accordance with a remaining level and a viscosity coefficient of the liquid.

9. The automatic application device as set forth in claim 1, wherein the application hand includes a painting roller for applying the liquid to the workpiece.

10. An automatic application method for applying a liquid to a workpiece with use of an automatic application device that includes a robot arm, an application hand attached to the robot arm, and a force sensor configured to detect a force and a moment acting on the application hand, the automatic application method comprising:
controlling the robot arm in accordance with a parameter calculated from an output signal from the force sensor, wherein
the parameter includes
a normal reaction applied to the application hand by the workpiece, and
a frictional force applied to the application hand by the workpiece, and
in said controlling, an action of the robot arm is controlled to make a magnitude of the normal reaction constant, and in a case where the frictional force is less than a first threshold, the application hand is replenished with the liquid.

11. The automatic application method as set forth in claim 10, wherein the control section determines a threshold of the friction force in accordance with the kind of the liquid.

12. The automatic application method as set forth in claim 10, wherein the first threshold is set in accordance with a remaining level and a viscosity coefficient of the liquid.

13. The automatic application method as set forth in claim 10, wherein the application hand includes a painting roller for applying the liquid to the workpiece.

* * * * *